US006006178A

United States Patent [19]
Taumi et al.

[11] Patent Number: 6,006,178

[45] Date of Patent: *Dec. 21, 1999

[54] SPEECH ENCODER CAPABLE OF SUBSTANTIALLY INCREASING A CODEBOOK SIZE WITHOUT INCREASING THE NUMBER OF TRANSMITTED BITS

[75] Inventors: Shin-Ichi Taumi; Kazunori Ozawa, both of Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/686,582

[22] Filed: Jul. 26, 1996

[30] Foreign Application Priority Data

Jul. 27, 1995 [JP] Japan .................................... 7-192176

[51] Int. Cl.[6] ................................ G01L 9/14; G01L 9/00

[52] U.S. Cl. ........................... 704/222; 704/219; 704/223

[58] Field of Search ................................. 395/2.28, 2.31, 395/2.32, 2.29, 2.38; 704/219–223, 229

[56] References Cited

U.S. PATENT DOCUMENTS

| | | | |
|---|---|---|---|
| 4,868,867 | 9/1989 | Davidson et al. | 395/2.32 |
| 5,140,638 | 8/1992 | Moulsley et al. | 395/2.38 |
| 5,526,464 | 6/1996 | Mermelstein | 395/2.28 |
| 5,602,961 | 2/1997 | Kolesnik et al. | 395/2.28 X |
| 5,621,852 | 4/1997 | Lin | 395/2.28 |
| 5,633,980 | 5/1997 | Ozawa | 395/2.32 X |
| 5,651,090 | 7/1997 | Moriya et al. | 395/2.31 |
| 5,657,418 | 8/1997 | Gerson et al. | 395/2.32 X |
| 5,659,659 | 8/1997 | Kolesnik et al. | 395/2.28 |

FOREIGN PATENT DOCUMENTS

| | | | |
|---|---|---|---|
| WO 93/05502 | 3/1993 | European Pat. Off. | G10L 5/00 |
| 0 545 386 A2 | 6/1993 | European Pat. Off. | G10L 9/14 |
| 0 658 877 A2 | 6/1995 | European Pat. Off. | G10L 9/14 |
| 4-171500 | 6/1992 | Japan . | |
| 4-363000 | 12/1992 | Japan . | |
| 5-6199 | 1/1993 | Japan . | |
| 5-210399 | 8/1993 | Japan . | |
| 6-12098 | 1/1994 | Japan . | |
| 6-138898 | 5/1994 | Japan . | |
| 6-274199 | 9/1994 | Japan . | |

OTHER PUBLICATIONS

Ozawa et al., "M–LCELP Speech Coding at 4kb/s with Multi–Mode and Multi–Codebook", IEICE Trans. Commun., vol. E77–B, No. 9, 1114–1121, Sep. 1994.

Sugamura et al., "Speech Data Compression by LSP Speech Analysis–Synthesis Technique", Transactions of the Institute of Electronics and Communication Engineers of Japan, J64–A, pp. 599–606, (1981).

(List continued on next page.)

*Primary Examiner*—David D. Knepper
*Attorney, Agent, or Firm*—Foley & Lardner

[57] ABSTRACT

In a speech encoder, a gain codebook switching circuit is supplied with short-term prediction gains from a short-term prediction gain calculator circuit and with mode information through an input terminal and compares the short-term prediction gains with a predetermined threshold value when the mode information indicates a predetermined mode. As a result of comparison, the gain codebook switching circuit produces gain codebook switching information which is delivered to a gain quantizer circuit. The gain codebook quantizer circuit is supplied with adaptive code vectors, excitation code vectors, impulse response information, and the gain codebook switching information, and gain code vectors from a particular gain codebook connected to one of a plurality of input terminals that is selected by the gain codebook switching information. For the excitation code vectors being selected, the gain quantizer circuit selects combinations of the excitation code vectors and the gain code vectors in the gain codebook selected by the gain codebook switching information.

5 Claims, 5 Drawing Sheets

OTHER PUBLICATIONS

Nomura et al., "LSP Coding Using VQ–SVQ with Interpolation in 4.075 KBPS M–LCELP Speech Coder", Mobile Multimedia Communications, pp. B.2.5–1 –B.2.5–4, (1993).

Taniguchi et al., "Improved Celp Speech Coding at 4 KBIT/S and Below", Proc. ISCLP, pp. 41–44, 1992.

Nakamizo, "Signal Analysis and System Identification", pp. 82–87, 1988.

Gersho et al., "Vector Quantization and Signal Compression ", Kluwer Academic Publishers, 1992, pp. 423,424 and 602–605.

SPEECH ENCODER CAPABLE OF SUBSTANTIALLY INCREASING A CODEBOOK SIZE WITHOUT INCREASING THE NUMBER OF TRANSMITTED BITS

BACKGROUND OF THE INVENTION

This invention relates to a speech encoder operable with a short processing delay and, in particular, to a speech encoder for encoding a speech or voice signal with a high quality at a short frame period or length of 5 ms to 10 ms or shorter.

A conventional speech encoding system is disclosed, for example, in a paper contributed by K. Ozawa et al to the IEICE Trans. Commun. Vol. E77-B, No. 9 (September 1994), pages 1114–1121, under the title of "M-LCELP Speech Coding at 4 kb/s with Multi-Mode and Multi-Codebook" (Reference 1).

According to the above-referenced conventional system, a speech signal is encoded in a transmitting side as follows. By the use of linear predictive coding (LPC), spectral parameters representative of spectral characteristics are extracted from the speech signal at every frame having a frame length of, for example, 40 ms. Calculation is made of feature quantities for signal frames or weighted signal frames obtained by perceptually weighting the signal frames. The feature quantities are used in deciding modes (for example, vowel and consonant segments) to produce mode decision results. With reference to the mode decision results, algorithm or codebooks are switched.

In an encoding part, each frame is subdivided into speech subframes having a subframe length of, for example, 8 ms long. Adaptive parameters (delay parameters corresponding to pitch periods and gain parameters) are extracted from an adaptive codebook for each speech subframe with reference to a previous excitation signal. By the use of the adaptive codebook, pitch prediction is carried out for the speech subframes. For a residual signal obtained by the pitch prediction, an optimal excitation code vector is selected from an excitation codebook (vector quantization codebook) composed of noise signals of a predetermined kind. Excitation signals are quantized by calculating an optimal gain.

The excitation code vector is selected so as to minimize an error power between the residual signal and a signal composed of a selected noise signal. A multi-plexer is used to produce a transmission signal composed of a combination of indexes indicative of the kind of the excitation code vector thus selected, gains, the spectral parameters, and the adaptive parameters of the adaptive codebook.

However, the conventional speech encoding system is disadvantageous in that a sufficient speech quality can not be obtained because of a restricted codebook size.

SUMMARY OF THE INVENTION

It is an object of this invention to provide a speech encoder which has a function equivalent to inclusion of a codebook having a size several times greater than that of a conventional speech encoder without increasing the number of transmitted bits.

Other objects of this invention will become clear as the description proceeds.

According to this invention, there is provided a speech encoder comprising: frame segmenting means for segmenting an input speech signal into speech frames at a predetermined frame length, mode deciding means responsive to the input speech signal for calculating at least one kind of first feature quantities to produce mode decision results, encoding means for encoding the input speech signal in response to the mode decision results, and codebook switching means responsive to at least one kind of second feature quantities calculated from the input speech signal for switching, when a predetermined mode is selected, a plurality of codebooks preliminarily stored.

The second feature quantities may include a temporal variation ratio of at least one kind of feature quantities.

The second feature quantities may include a ratio of the two feature quantities of any two frames selected from a current frame and at least one previous frame.

The second feature quantities may include at least one of pitch prediction gains, short-term prediction gains, levels, and pitches.

The plurality of codebooks may comprise a plurality of RMS codebooks, a plurality of LSP codebooks, a plurality of adaptive codebooks, a plurality of excitation codebooks, or a plurality of gain codebooks.

DESCRIPTION OF THE PREFERRED EMBODIMENTS

Figure 1:
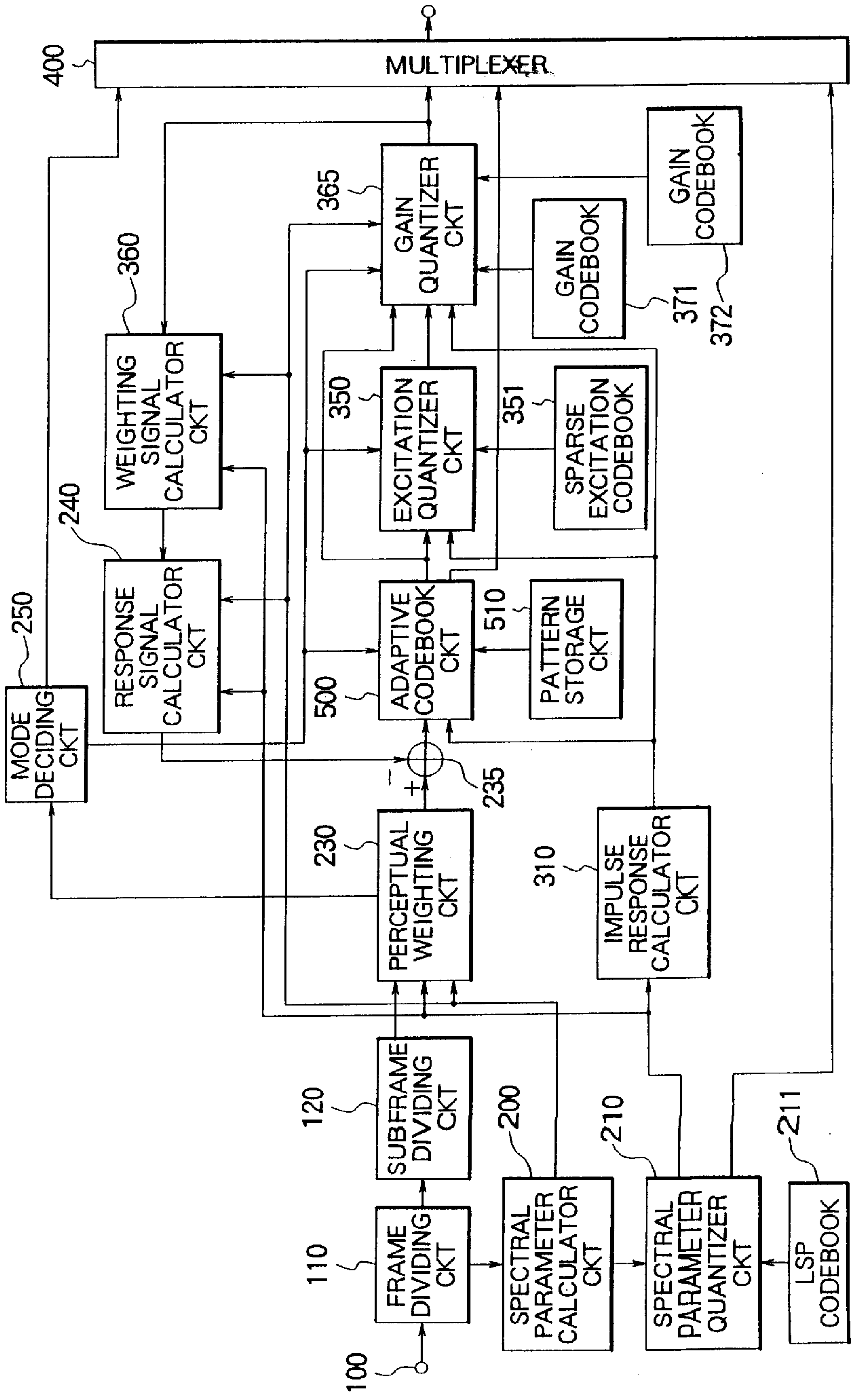
FIG. 1 is a block diagram of a speech encoder according to one embodiment of this invention.

Now, this invention will be described in detail with reference to the drawing. As an example, description will be directed to a case where a plurality of gain codebooks are switched in a predetermined mode.

FIG. 1 shows a speech encoder according to a first embodiment of this invention. In the following description, gain codebooks are switched in a predetermined mode by the use of second feature quantities.

Referring to FIG. 1, an input speech signal is supplied through an input terminal 100 to a frame dividing circuit 110. The frame dividing circuit 110 segments or divides the input speech signal into speech frames at a predetermined frame period or length of, for example, 5 ms. Supplied with the speech frames, a subframe dividing circuit 120 further divides every single speech frame into speech subframes each of which has a subframe length of, for example, 2.5 ms shorter than the frame length.

A spectral parameter calculator circuit 200 calculates spectral parameters of the input speech signal up to a predetermined order, such as up to a tenth order (P=10), by applying a window of a window length (for example, 24 ms) longer than the subframe length to at least one of the speech subframes to extract the input speech signal. Herein, the spectral parameters can be calculated according to the LPC analysis or the Burg analysis well known in the art. In the example being illustrated, the Burg analysis is used. The Burg analysis is described in detail, for example, in a book written by Nakamizo and published in 1988 by Korona-sha under the title of "Signal Analysis and System Identification", pages 82 to 87 (Reference 2) and will not be described herein.

After calculating linear prediction coefficients $\alpha_i$ (i=1, . . . , 10) by the use of the Burg analysis, the spectral parameter calculator circuit 200 converts the linear prediction coefficients $\alpha_i$ into LSP (linear spectral pair) parameters which are suitable for quantization and interpolation. Such conversion from the linear prediction coefficients into the LSP parameters are described in a paper contributed by Sugamura et al to the Transactions of the Institute of Electronics and Communication Engineers of Japan, J64-A (1981), pages 599 to 606, under the title of "Speech Data Compression by Linear Spectral Pair (LSP) Speech Analysis-Synthesis Technique" (Reference 3).

Specifically, each speech frame consists of first and second subframes in the example being described. The linear prediction coefficients are calculated by the Burg analysis for the second subframes and converted into the LSP parameters. For the first subframe, the LSP parameters are calculated by linear interpolation of the LSP parameters of the second subframes and are inverse-converted into the linear prediction coefficients. In this manner, the spectral parameter calculator circuit 200 produces the linear prediction coefficients $\alpha_{iI}$ (i=1, . . . , 10, I=1, . . . , S) for the first and the second subframes and delivers the linear prediction coefficients $\alpha_{iI}$ to a perceptual weighting circuit 230. On the other hand, the spectral parameter calculator circuit 200 delivers the LSP parameters for the first and the second subframes to a spectral parameter quantizer circuit 210.

The spectral parameter quantizer circuit 210 serves to efficiently quantizer LSP parameters of a predetermined subframe. In the following description, it is assumed that the LSP parameters of the second subframe are quantized by the use of vector quantization. For vector quantization of the LSP parameters, it is possible to use various known techniques. For example, such vector quantization is described in detail in Japanese Unexamined Patent Publication No. 171500/1992 (Reference 4), Japanese Unexamined Patent Publication No. 363000/1992 (Reference 5), Japanese Unexamined Patent Publication No. 6199/1993 (Reference 6), and a paper contributed by T. Nomura et al to the Proc. Mobile Multimedia Communications, pages B.2.5-1 to B.2.5-4 (1993), under the title of "LSP Coding Using VQ-SVQ with Interpolation in 4.075 kbps M-LCELP Speech Coder" (Reference 7). Therefore, detailed description will not herein be made.

The spectral parameter quantizer circuit 210 reproduces the LSP parameters for the first and the second subframes from the LSP parameters quantized in connection with each second subframe. Herein, the LSP parameters for the first and the second subframes are reproduced by linear interpolation between the quantized LSP parameters of the second subframe of a current frame and the quantized LSP parameters of the second subframe of a previous frame which is one frame period prior to the current frame.

More in detail, the LSP parameters for the first and the second subframes can be reproduced by linear interpolation after a single code vector is selected so as to minimize an error power between the LSP parameters before and after quantization. In order to achieve a higher efficiency, it is possible to select a plurality of code vector candidates for minimization of the error power, to evaluate cumulative distortions in connection with those candidates, and to select a combination of one of the candidates that minimizes the cumulative distortions and interpolated LSP parameters.

The spectral parameter quantizer circuit 210 converts the LSP parameters for the first and the second subframes thus reproduced and the quantized LSP parameters of the second subframe into converted linear prediction coefficients $\alpha'_{iI}$ (i=1, . . . , 10, I=1, . . . , 5) for every subframe. The converted linear prediction coefficients $\alpha'_{iI}$ are delivered to an impulse response calculator circuit 310. In addition, the spectral parameter quantizer circuit 210 supplies a multiplexer 400 with indexes indicative of the code vectors for the quantized LSP parameters of the second subframe.

Instead of the linear interpolation in the foregoing description, it is possible to preliminarily prepare interpolation LSP patterns for a predetermined number of bits, such as two bits, to reproduce the LSP parameters of the first and the second subframes for each pattern, and to select a combination of one of the code vectors that minimizes the cumulative distortions and the interpolation patterns. In this event, an amount of transmitted information is inevitably increased in correspondence to the number of bits of the interpolation patterns. However, it is possible to more exactly represent temporal variations of the LSP parameters in each speech frame.

The interpolation patterns may be prepared by preliminarily learning training LSP data. Alternatively, predetermined patterns may be stored as the interpolation patterns. For example, such predetermined patterns are described in a paper contributed by T. Taniguchi et al to the Proc. ICSLP (1992), pages 41 to 44, under the title of "Improved CELP Speech Coding at 4 kbit/s and below" (Reference 8). Alternatively, in order to further improve the performance, it is possible to preselect the interpolation patterns, to calculate an error signal between actual values of the LSP parameters and interpolated LSP values for a predetermined subframe, and to represent the error signal by the use of an error codebook.

The perceptual weighting circuit 230 is supplied from the spectral parameter calculator circuit 200 with the linear prediction coefficients $\alpha_{iI}$ (i1, . . . , 10, I=1, . . . , 5) before quantization subframe by subframe. According to the technique described in the above-mentioned Reference 1, the perceptual weighting circuit 230 gives perceptual or auditory weights to the speech subframes to produce a perceptually weighted signal.

Supplied with the perceptually weighted signal from the perceptual weighting circuit 230 frame by frame, a mode deciding circuit 250 decides pitch prediction gains and modes (for example, vowel and consonant segments) with reference to a predetermined threshold value. The mode deciding circuit 250 delivers a mode decision result to an adaptive codebook circuit 500 and to an excitation quantizer circuit 350.

Turning back to FIG. 1, a response signal calculator circuit 240 is supplied from the spectral parameter calculator circuit 200 with the linear prediction coefficients $\alpha_{iI}$ subframe by subframe. In addition, the response signal calculator circuit 240 is supplied from the spectral parameter quantizer circuit 210 with the converted linear prediction coefficients $\alpha'_{iI}$, subframe by subframe, reproduced after quantization and interpolation. By the use of a filter memory value being stored, the response signal calculator circuit 240 calculates a response signal $x_z(n)$ for each single subframe in response to the input signal given by d(n)=0 and delivers the response signal to a subtractor 235. The response signal $x_z(n)$ is represented by:

$$x_z(n) = d(n) - \sum_{i=1}^{10} \alpha_i d(n-i) + \sum_{i=1}^{10} \alpha_i \gamma^i y(n-i) + \sum_{i=1}^{10} \alpha_i' \gamma^i x_z(n-i), \tag{1}$$

where γ represents a weighting factor which controls the perceptual weight and has a value equal to that given by Equation (b 3) which will appear later.

The subtractor 235 subtracts the response signal from the perceptually weighted signal for one subframe to produce a subframe difference signal $x'_w(n)$ which is delivered to the adaptive codebook circuit 500. The subframe difference signal $x'_w(n)$ is given by:

$$x'_w(n) = x_w(n) - x_z(n). \tag{2}$$

The impulse response calculator circuit 310 calculates, at a predetermined number L of points, impulse responses $h_w(n)$ of a weighted filter. The impulse responses $h_w(n)$ are delivered to the adaptive codebook circuit 500 and to excitation quantizer circuit 350. Z-transform of the impulse responses $h_w(n)$ is given by:

$$H_w(z) = \frac{1 - \sum_{i=1}^{10} \alpha_i z^{-i}}{1 - \sum_{i=1}^{10} \alpha_i \gamma^i z^{-i}} \frac{1}{1 - \sum_{i=1}^{10} \alpha_i' \gamma^i z^{-i}}. \tag{3}$$

The adaptive codebook circuit 500 calculates pitch parameters in the manner described in detail in Reference 2. The adaptive codebook circuit 500 also carries out pitch prediction to produce an adaptive codebook prediction difference signal z(n) given by:

$$z(n)=x'_w(n)-b(n), \tag{4}$$

where b(n) represents an adaptive codebook pitch prediction signal defined by:

$$b(n)=\beta v(n-T)*h_w(n), \tag{5}$$

where β and T represent the gain of the adaptive codebook circuit 500 and a delay, respectively. v(n) represents an adaptive code vector. The symbol * represents convolution.

A sparse excitation codebook 351 of a non-regular pulse number type stores excitation code vectors different in number of non-zero vector components.

For all or a part of the excitation code vectors stored in the excitation codebook 351, the excitation quantizer circuit 350 selects optimal excitation code vectors $c_j(n)$ so as to minimize j-th differences $D_j$. Herein, it is possible to select a single kind of the optimal code vectors. Alternatively, it is possible to select two or more kinds of the optimal code vectors and to finally select one upon quantization of the gains. It is assumed here that two or more kinds of the code vectors are selected. The j-th differences $D_j$ are given by:

$$D_j = \sum_n (z(n) - \gamma_j c_j(n) h_w(n))^2, \tag{6}$$

where z(n) represents the prediction difference signal with respect to the adaptive code vectors being selected.

In case where Equation (6) is applied to a part of the excitation code vectors alone, it is possible to preliminarily select a plurality of excitation code vectors and to apply Equation (6) to the excitation code vectors preliminarily selected.

Supplied with the mode decision information from the mode deciding circuit 250 and with the spectral parameters from the spectral parameter calculator circuit 200, a gain quantizer circuit 365 selects one of gain codebooks 371 and 372 by the use of second feature quantities when the mode decision information indicates a predetermined mode. The gain quantizer circuit 365 reads gain code vectors from a selected one of the gain code-books 371 and 372 and supplies the indexes indicative of the excitation and the gain code vectors to the multiplexer 400.

Figure 2:
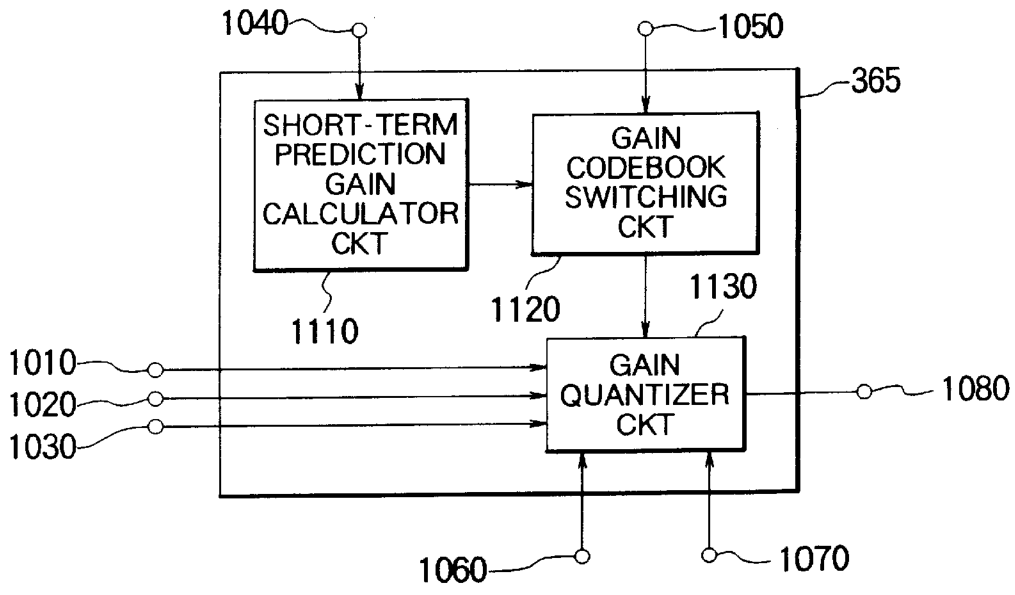
FIG. 2 is a block diagram of a gain quantizer circuit illustrated in FIG. 1.

Referring to FIG. 2, description will be made as regards the gain quantizer circuit 365. A short-term prediction gain calculator circuit 1110 is supplied with the spectral parameters through an input terminal 1040 and calculates, as the second feature quantities, short-term prediction gains G which are delivered to a gain codebook switching circuit 1120. The short-term prediction gains G are given by:

$$G = 10\log_{10}\frac{\|x\|^2}{\|E\|^2}, \tag{7}$$

where $$E(n) = x(n) - \sum_{i=1}^{10} \alpha_i x(n-i).$$

Supplied with the short-term prediction gains from the short-term prediction gain calculator circuit 1110 and with the mode information through an input terminal 1050, the gain codebook switching circuit 1120 compares the short-term prediction gain with a predetermined threshold value when the mode information indicates a predetermined mode. As a result of comparison, the gain codebook switching circuit 1120 produces gain codebook switching information which is delivered to a gain quantizer circuit 1130. The gain quantizer circuit 1130 is supplied with the adaptive code vectors through an input terminal 1010, with the excitation code vectors through an input terminal 1020, and with the impulse response information through an input terminal 1030. The gain quantizer circuit 1130 is also supplied with the gain codebook switching information from the gain codebook switching circuit 1120 and with the gain code vectors from the gain code book 371 or 372 (FIG. 1) connected to one of input terminals 1060 and 1070 that is selected by the gain codebook switching information. For the excitation code vectors being selected, the gain quantizer circuit 1130 selects combinations of the excitation code vectors and the gain code vectors in the gain codebook selected by the gain codebook switching information so as to minimize (j,k)-th differences defined by:

$$D_{j,k} = \sum_n (x_w(n) - \beta_k' v(n-T) h_w(n) - \gamma_k' c_j(n) h_w(n))^2, \tag{8}$$

where β 'k and γ 'k represent a k-th two-dimensional code vector stored in the gain codebook selected by the gain codebook switching information. The gain quantizer circuit 1130 delivers to an output terminal 1080 the indexes indicative of the selected combinations of the excitation code vectors and the gain code vectors.

Turning back to FIG. 1, supplied with the output parameters of the spectral parameter calculator circuit 200 together with their indexes, a weighting signal calculator circuit 360 reads the code vectors with reference to their indexes and calculates a drive excitation signal v(n) according to:

$$v(n)=\beta'_k v(n-T)+\gamma'_k c_j(n) \tag{9}$$

Subsequently, by the use of the output parameters of the spectral parameter calculator circuit 200 and the output parameters of the spectral parameter quantizer circuit 210, the weighting signal calculator circuit 360 calculates a weighting signal $s_w(n)$ for every subframe to deliver the weighting signal to the response signal calculator circuit 240 in accordance with:

$$s_w(n) = v(n) - \sum_{i=1}^{10} \alpha_i v(n-i) + \sum_{i=1}^{10} \alpha_i \gamma^i p(n-i) + \sum_{i=1}^{10} \alpha_i' \gamma^i s_w(n-i). \tag{10}$$

Next, description will be made as regards a speech encoder according to a second embodiment of this invention.

The speech encoder of this embodiment is similar in structure to that of the first embodiment except that the gain quantizer circuit 365 is replaced by a gain quantizer circuit 2365. In the following, the gain quantizer circuit 2365 alone will be described with reference to FIG. 3.

Figure 3:
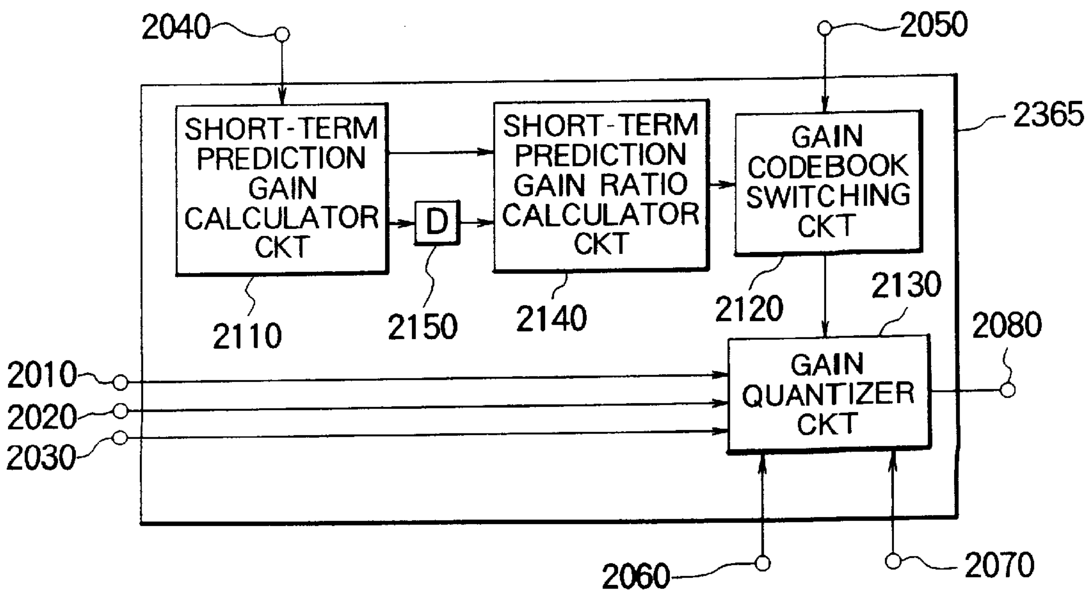
FIG. 3 is a block diagram of a modification of the gain quantizer circuit illustrated in FIG. 1.

Referring to FIG. 3, a short-term prediction gain calculator circuit 2110 is supplied with the spectral parameters through an input terminal 2040 and calculates, as the second feature quantities, short-term prediction gains G which are delivered to a short-term prediction gain ratio calculator circuit 2140 and to a delay unit 2150. The short-term prediction gains G are given by the above equation (7) described with respect to the first embodiment.

Supplied with the short-term prediction gain of a current frame from the short-term prediction gain calculator circuit 2110 and with the short-term prediction gain of a previous frame (one frame period prior to the current frame) from the delay unit 2150, the short-term prediction gain ratio calculator circuit 2140 calculates a short-term prediction gain ratio as a time ratio and delivers the short-term prediction ratio to a gain codebook switching circuit 2120. Supplied with the short-term prediction gain ratio from the short-term prediction gain ratio calculator circuit 2140 and with the mode information through an input terminal 2050, the gain codebook switching circuit 2120 compares the short-term prediction gain ratio with a predetermined threshold value when the mode information indicates a predetermined mode. As a result of comparison, the gain codebook switching circuit 2120 produces gain codebook switching information which is delivered to a gain quantizer circuit 2130. The gain quantizer circuit 2130 is supplied with the adaptive code vectors through an input terminal 2010, with the excitation code vectors through an input terminal 2020, and with the impulse response information through an input terminal 2030. The gain quantizer circuit 2130 is also supplied with the gain codebook switching information from the gain codebook switching circuit 2120 and with the gain code vectors from the gain codebook 371 or 372 (FIG. 1) connected to one of input terminals 2060 and 2070 that is selected by the gain codebook switching information. For the excitation code vectors being selected, the gain quantizer circuit 2130 selects combinations of the excitation code vectors and the gain code vectors in the gain codebook selected by the gain codebook switching information so as to minimize (j,k)-th differences defined by the above equation (8) described with respect to the first embodiment. In this embodiment, the gain quantizer circuit 2130 delivers to an output terminal 2080 the indexes indicative of the selected combinations of the excitation code vectors and the gain code vectors.

Description will now be made as regards a speech encoder according to a third embodiment of this invention.

The speech encoder of this embodiment is similar in structure to that of the first embodiment except that the gain quantizer circuit 365 is replaced by a gain quantizer circuit 3365. In the following, the gain quantizer circuit 3365 alone will be described with reference to FIG. 4.

Figure 4:
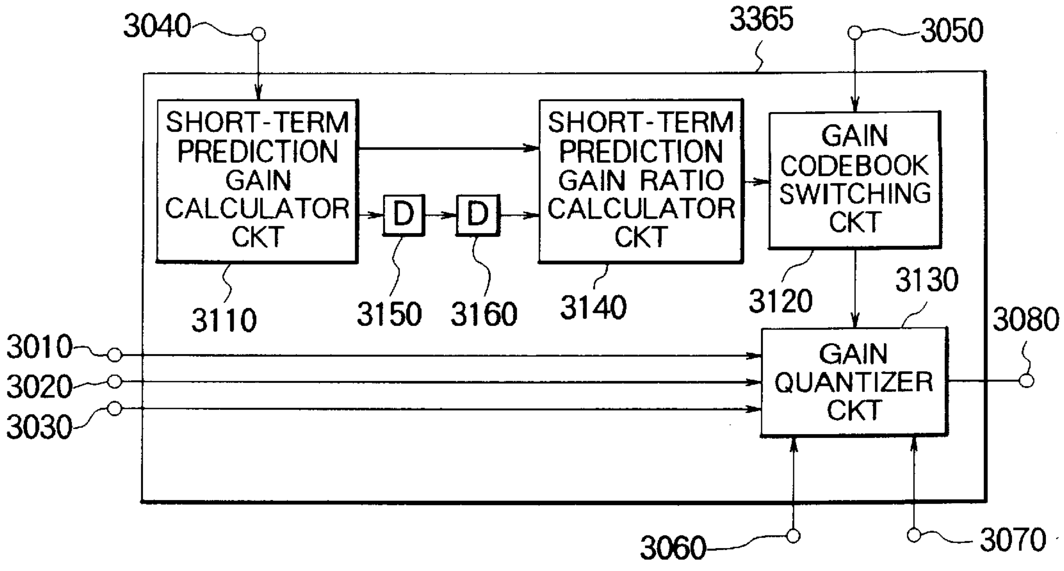
FIG. 4 is a block diagram of another modification of the gain quantizer circuit illustrated in FIG. 1.

Referring to FIG. 4, a short-term prediction gain calculator circuit 3110 is supplied with the spectral parameters through an input terminal 3040 and calculates, as the second feature quantities, short-term prediction gains G which are delivered to a short-term prediction gain ratio calculator circuit 3140 and to a delay unit 3150. The short-term prediction gains G are given by the above equation (7) described with respect to the first embodiment.

Supplied with the short-term prediction gain of a current frame from the short-term prediction gain calculator circuit 3110 and with the short-term prediction gain of a previous frame (two frame periods prior to the current frame) from the delay unit 3160, the short-term prediction gain ratio calculator circuit 3140 calculates a short-term prediction gain ratio and delivers the short-term prediction gain ratio to a gain codebook switching circuit 3120. Supplied with the short-term prediction gain ratio from the short-term prediction gain ratio calculator circuit 3140 and with the mode information through an input terminal 3050, the gain codebook switching circuit 3120 compares the short-term prediction gain ratio with a predetermined threshold value when the mode information indicates a predetermined mode. As a result of comparison, the gain codebook switching circuit 3120 produces gain codebook switching information which is delivered to a gain quantizer circuit 3130. The gain quantizer circuit 3130 is supplied with the adaptive code vectors through an input terminal 3010, with the excitation code vectors through an input terminal 3020, and with the impulse response information through an input terminal 3030. The gain quantizer circuit 3130 is also supplied with the gain codebook switching information from the gain codebook switching circuit 3120 and with the gain code vectors from the gain codebook 371 or 372 (FIG. 1) connected to one of input terminals 3060 and 3070 that is selected by the gain codebook switching information. For the excitation code vector being selected, the gain quantizer circuit 3130 selects combinations of the excitation code vectors and the gain code vectors in the gain codebook selected by the gain codebook switching information so as to minimize (j,k)-th differences defined by the above equation (8) described with respect to the first embodiment. In this embodiment, the gain quantizer circuit 3130 delivers to an output terminal 3080 the indexes indicative of the selected combinations of the excitation code vectors and the gain code vectors.

Next, description will be made as regards a speech encoder according to a fourth embodiment of this invention.

The speech encoder of this embodiment is similar in structure to that of the first embodiment except that the gain quantizer circuit 365 is replaced by a gain quantizer circuit 4365. In the following, the gain quantizer circuit 4365 alone will be described with reference to FIG. 5.

Figure 5:
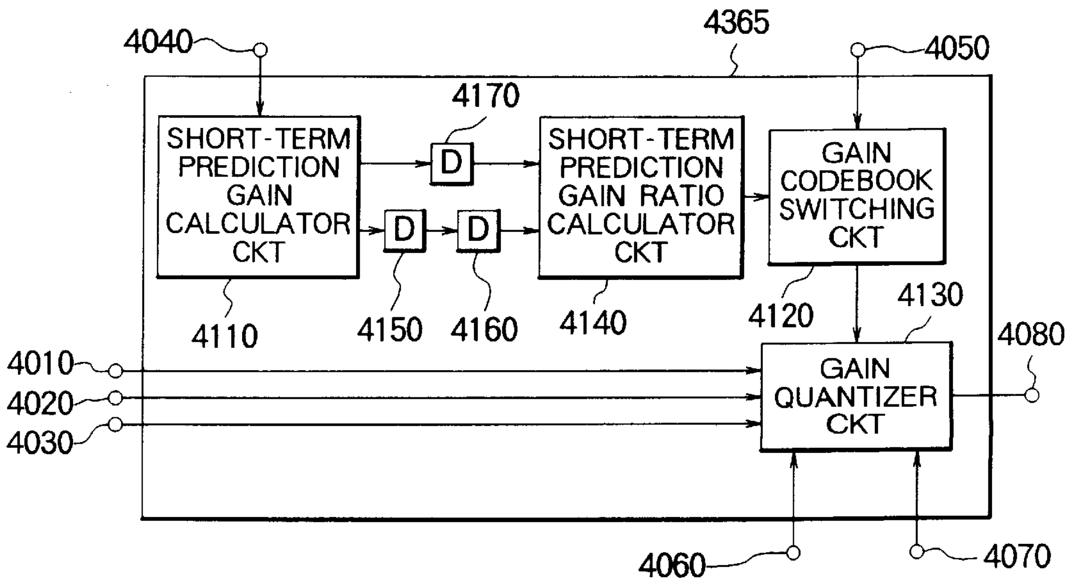
FIG. 5 is a block diagram of yet another modification of the gain quantizer circuit illustrated in FIG. 1.

Referring to FIG. 5, a short-term prediction gain calculator circuit 4110 is supplied with the spectral parameters through an input terminal 4040 and calculates, as the second feature quantities, short-term prediction gains G which are delivered to delay units 4170 and 4150. The short-term prediction gains G are given by the above equation (7) described with respect to the first embodiment.

Supplied with the short-term prediction gain of a previous frame (one frame period prior to the current frame) from the delay unit 4170 and with the short-term prediction gain of another previous frame (two frame periods prior to the current frame) from the delay unit 4160, the short-term prediction gain ratio calculator circuit 4140 calculates a short-term prediction gain ratio and delivers the short-term prediction gain ratio to a gain codebook switching circuit 4120. Supplied with the short-term prediction gain ratio from the short-term prediction gain ratio calculator circuit 4140 and with the mode information through an input terminal 4050, the gain codebook switching circuit 4120 compares the short-term prediction gain ratio with a predetermined threshold value when the mode information indicates a predetermined mode. As a result of comparison, the gain codebook switching circuit 4120 produces gain codebook switching information which is delivered to a gain quantizer circuit 4130. The gain quantizer circuit 4130 is supplied with the adaptive code vectors through an input terminal 4010, with the excitation code vectors through an input terminal 4020, and with the impulse response information through an input terminal 4030. The gain quantizer circuit 4130 is also supplied with the gain codebook switching information from the gain codebook switching circuit 4120 and with the gain code vectors from the gain codebook 371 or 372 (FIG. 1) connected to one of input terminals 4060 and 4070 that is selected by the gain codebook switching information. For the excitation code vectors being selected, the gain quantizer circuit 4130 selects combinations of the excitation code vectors and the gain code vectors in the gain codebook selected by the gain codebook switching information so as to minimize (j,k)-th differences defined by the above equation (8) described with respect to the first embodiment. In this embodiment, the gain quantizer circuit 4130 delivers to an output terminal 4080 the indexes indicative of the selected combinations of the excitation code vectors and the gain code vectors.

Description will now be made as regards a speech encoder according to a fifth embodiment of this invention.

Figure 6:
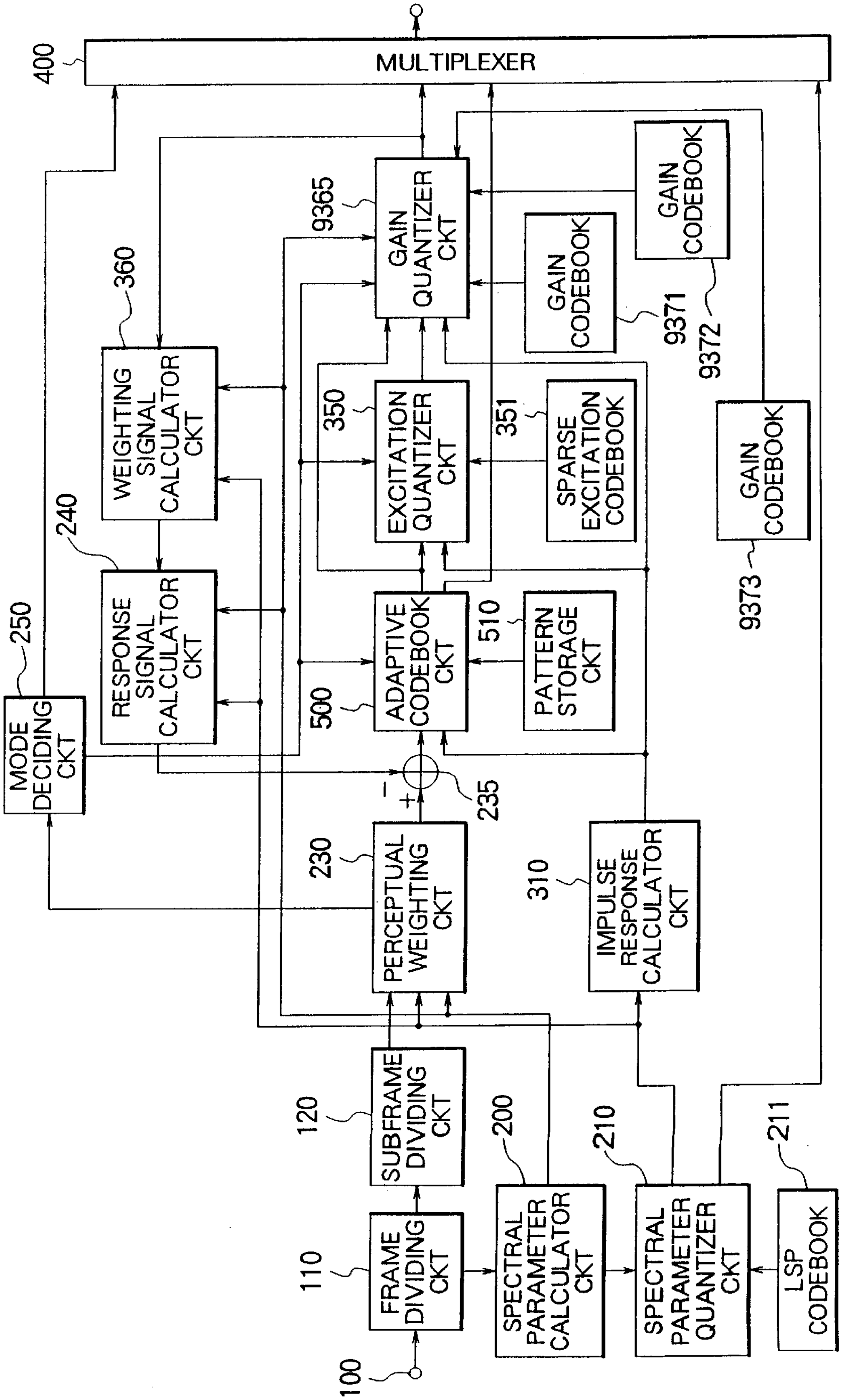
FIG. 6 is a block diagram of a speech encoder according to another embodiment of this invention.

The speech encoder of this embodiment is similar in structure to that of the first embodiment except that the gain quantizer circuit 365 is replaced by a gain quantizer circuit 9365 and that the gain codebooks 371 and 372 are replaced by gain codebooks 9371, 9372, and 9373. The speech encoder of the fifth embodiment will hereinafter be described with reference to FIGS. 6 and 7.

Supplied with the mode decision information from the mode deciding circuit 250 and with the spectral parameters from the spectral parameter calculator circuit 200, the gain quantizer circuit 9365 selects one of the gain codebooks 9371, 9372, and 9373 by the use of the second feature quantities when the mode decision information indicates a predetermined mode. The gain quantizer circuit 9365 reads the gain code vectors from a selected one of the gain codebooks 9371 through 9373 and supplies the indexes indicative of the excitation and the gain code vectors to the multiplexer 400.

Figure 7:
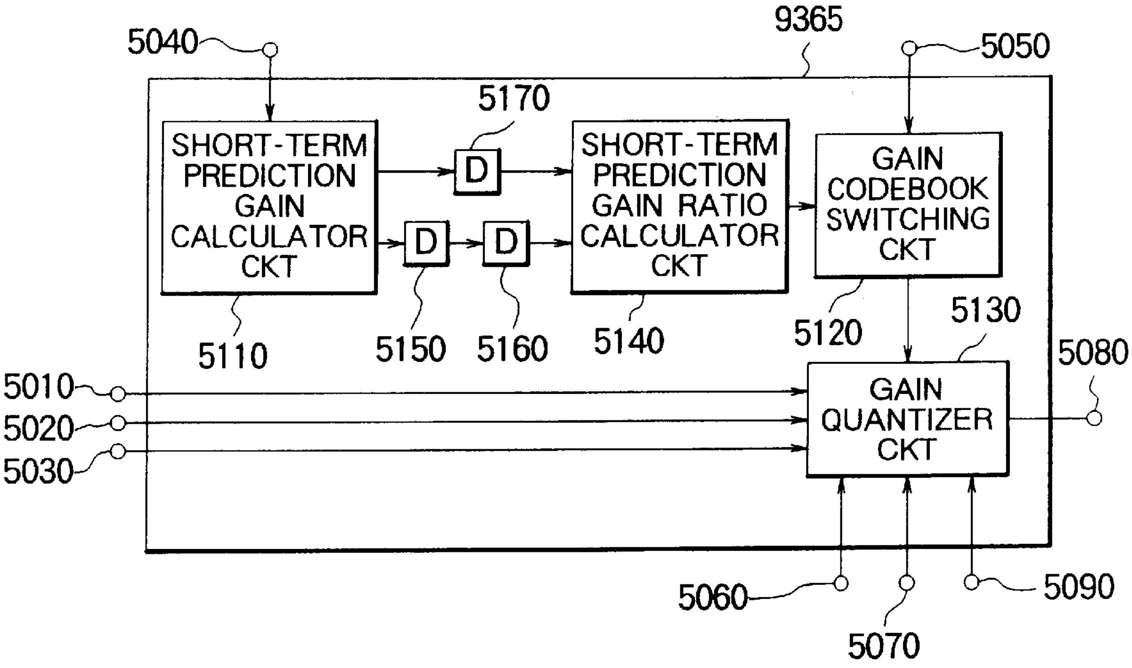
FIG. 7 is a block diagram of a gain quantizer circuit illustrated in FIG. 6.

Referring to FIG. 7, a short-term prediction gain calculator circuit 5110 is supplied with the spectral parameters through an input terminal 5040 and calculates, as the second feature quantities, short-term prediction gains G which are delivered to delay units 5170 and 5150. The short-term prediction gains G are given by the above equation (7) described with respect to the first embodiment.

Supplied with the short-term prediction gain of a previous frame (one frame period prior to the current frame) from the delay unit 5170 and with the short-term prediction gain of another previous frame (two frame periods prior to the current frame) from the delay unit 5160, the short-term prediction gain ratio calculator circuit 5140 calculates a short-term prediction gain ratio and delivers the short-term prediction gain ratio to a gain codebook switching circuit 5120. Supplied with the short-term prediction gain ratio from the short-term prediction gain ratio calculator circuit 5140 and with the mode information through an input terminal 5050, the gain codebook switching circuit 5120 compares the short-term prediction gain ratio with a predetermined threshold value when the mode information indicates a predetermined mode. As a result of comparison, the gain codebook switching circuit 5120 produces gain codebook switching information which is delivered to a gain quantizer circuit 5130. The gain quantizer circuit 5130 is supplied with the adaptive code vectors through an input terminal 5010, with the excitation code vectors through an input terminal 5020, and with the impulse response information through an input terminal 5030. The gain quantizer circuit 5130 is also supplied with the gain codebook switching information from the gain codebook switching circuit 5120 and with the gain code vectors from the gain codebook 9371, 9372, or 9373 connected to one of input terminals 5060, 5070, and 5090 that is selected by the gain codebook switching information. For the excitation code vectors being selected, the gain quantizer circuit 5130 selects combinations of the excitation code vectors and the gain code vectors in the gain codebook selected by the gain codebook switching information so as to minimize (j,k)-th differences defined by the above equation (8) described with respect to the first embodiment. In this embodiment, the gain quantizer circuit 5130 delivers to an output terminal 5080 the indexes indicative of the selected combinations of the excitation code vectors and the gain code vectors.

As described above, a plurality of the codebooks are switched in a predetermined mode. Thus, the speech encoder according to this invention has a function equivalent to inclusion of a codebook having a size several times greater than that of the conventional speech encoder without increasing the number of transmitted bits. This makes it possible to improve a speech quality.

What is claimed is:

1. A speech encoder, comprising:

a frame divider circuit configured to receive an input speech signal and to segment the input speech signal into speech frames at a predetermined frame length;

a frame subdivider circuit configured to receive the segmented input speech signal output from the frame divider circuit and to subdivide the segmented input speech signal into speech sub-frames at a predetermined sub-frame length that is less that the predetermined frame length;

a spectral parameter calculating circuit configured to receive the segmented input speech signal output from the frame divider circuit and to determine spectral parameters therefrom, said spectral parameters corresponding to linear prediction coefficients determined on a sub-frame-by-sub-frame basis;

a perceptual weighting circuit configured to receive the sub-frame segmented input speech signal output from the frame subdivider circuit and the spectral parameters output by the spectral parameter calculating circuit, to determine perceptual weights for the sub-frame segmented input speech signal and to output a perceptually weighted signal based on the determined perceptual weights;

a mode deciding circuit connected to receive the perceptually weighted signal output by the perceptual weighting circuit and to calculate at least one kind of first feature quantities that correspond to pitch prediction gains and modes, on a sub-frame-by-sub-frame basis, to produce a mode decision result;

a plurality of gain codebooks;

a gain quantizer circuit connected to receive the mode decision result output by the mode deciding circuit and the spectral parameters output by the spectral parameter calculating circuit, and to select one of the plurality of gain codebooks based on second feature quantities determined by the gain quantizer circuit from the sub-frame segmented input speech signal;

an output device for receiving and outputting gain code vectors received from the selected one of the plurality of gain codebooks, a spectral parameter quantizing circuit configured to receive the linear prediction coefficients output by the spectral parameter calculating circuit, to quantize and interpolate the linear prediction coefficients, and to output converted linear prediction coefficients as a result;

a response signal calculator circuit configured to receive the linear prediction coefficients output by the spectral parameter calculating circuit and the converted linear prediction coefficients output by the spectral parameter quantizing circuit, and to calculate a response signal on a sub-frame by sub-frame basis, the response signal being based on a first signal received by said response signal calculator circuit;

a subtractor configured to subtract the response signal from the perceptually weighted signal and to output a subtraction result;

an impulse response calculator circuit configured to receive the converted linear prediction coefficients output by the spectral parameter quantizer circuit and to calculate, at a predetermined number of points, an impulse response that is based on a weighting factor;

an adaptive codebook circuit configured to receive the impulse response outputted by the impulse response calculator circuit and the subtraction result output by the subtractor, and to calculate pitch parameters to output an adaptive codebook pitch difference signal and an adaptive code vector;

an excitation codebook configured to store excitation code vectors; and an excitation quantizer circuit coupled to the excitation codebook and configured to receive the impulse response outputted by the impulse response calculator circuit and the adaptive codebook pitch difference signal output by the adaptive codebook circuit, the excitation quantizer circuit configured to select at least one optimal excitation code vector as a result, wherein said gain quantizer circuit includes a short-term prediction calculator circuit configured to determine the second feature quantities from the spectral parameters received from the spectral parameter calculating circuit, and wherein said gain quantizer circuit selects the one of the plurality of gain codebooks based on the second feature quantities as a result of the mode decision result indicating a predetermined mode, wherein the excitation quantizer circuit outputs the at least one optimal excitation code vector to the gain quantizer circuit, and wherein the gain quantizer circuit outputs indexes indicative of the optimal excitation code vector and a gain code vector obtained from the one of the plurality of gain codebooks to the output device.

2. A speech encoder as claimed in claim 1, wherein said gain quantizer circuit outputs a set of code vectors that includes the optimal excitation code vector and the gain code vector obtained from the one of the plurality of gain codebooks to the output device so as to minimize a difference therebetween.

3. A speech encoder as claimed in claim 2, wherein said gain quantizer circuit comprises:

a short-term prediction gain calculator circuit configured to receive the linear prediction coefficients from the spectral parameter calculating circuit and to calculate the second feature quantities;

a gain codebook switching circuit configured to receive the mode decision result from the mode deciding circuit and the second feature quantities from the short-term prediction gain calculator circuit, and to determine and output gain codebook switching information, wherein the gain codebook switching circuit compares the second feature quantities with a predetermined threshold when the mode decision information indicates a predetermined mode; and a gain quantizer unit coupled to the plurality of gain codebooks and configured to receive the adaptive code vector output by the adaptive codebook circuit, the output gain codebook switching information output by the gain codebook switching circuit, the at least one optimal excitation code vector output by the excitation quantizer circuit, and the impulse response output by the impulse response calculator circuit, the gain quantizer circuit configured to select a combination of the at least one excitation code vector and gain code vectors obtained from the plurality of codebooks so as to minimize a difference therebetween.

4. A speech encoder as claimed in claim 2, wherein said gain quantizer circuit further comprises:

a short-term prediction gain ratio calculator circuit configured to receive the linear prediction coefficients from the spectral parameter calculating circuit from a current frame and the linear prediction coefficients from a previous frame, the short-term prediction gain ratio calculator circuit configured to determine and output a short-term prediction ratio as a result, wherein the gain codebook switching circuit receives the short-term prediction ratio and compares the short-term prediction ratio with a predetermined threshold value when the mode information indicates the predetermined mode, the gain quantizer unit outputting the gain codebook switching information to the gain quantizer unit which is based on the comparison made by the gain codebook switching circuit.

5. A speech encoder as claimed in claim 1, further comprising a weighting signal calculator circuit configured to receive the linear prediction coefficients output by the spectral parameter calculating circuit, the converted linear prediction coefficients output by the spectral parameter quantizing circuit, and the indexes output by the gain quantizer circuit, wherein the first signal provided to the response signal calculator circuit corresponds to the indexes output by the gain quantizer circuit that have been weighted based on the linear prediction coefficients and the converted linear prediction coefficients.

* * * * *